United States Patent Office 3,845,154
Patented Oct. 29, 1974

3,845,154
CONTINUOUS PROCESS FOR RECYCLING SOLVENT AND RHODIUM CATALYST IN PRODUCING 1,4-HEXADIENE
William John Keller, Beaumont, Tex., assignor to E. I. du Pont de Nemours and Company, Wilmington, Del.
No Drawing. Filed Oct. 25, 1973, Ser. No. 409,597
Int. Cl. C07c 11/12
U.S. Cl. 260—680 B    9 Claims

ABSTRACT OF THE DISCLOSURE

A continuous process for recycling solvent and catalyst during the preparation of 1,4-hexadiene which comprises co-reacting ethylene and 1,3-butadiene in the presence of a rhodium catalyst in a one-phase liquid reaction zone containing a water-soluble poly(oxyethylene)ether solvent, passing the resulting liquid effluent from the reaction zone to a flasher to remove 1,4-hexadiene, recirculating a major portion of the residual liquid effluent from the flasher to the reaction zone, while, at the same time, circulating the balance of the residual liquid effluent from the flasher constituting 0.25–10% by weight of the effluent containing poly(oxyethylene)ether solvent, rhodium catalyst and high-boiling hydrocarbon by-products having $C_8$–$C_{12}$ fractions to a vessel, mixing it with at least about 30% by volume water to form an organic phase containing said high-boiling hydrocarbons and an aqueous phase containing poly(oxyethylene)ether solvent and rhodium catalyst, separating the aqueous phase containing solvent from the organic phase, and circulating the solvent from the aqueous phase to the reaction zone for reuse in the process.

BACKGROUND OF THE INVENTION

This invention is directed to a process for recycling solvent and catalyst for reuse in a system for making 1,4-hexadiene.

One-phase liquid reaction systems for making 1,4-hexadiene, used for preparing EPDM copolymers, are known and have been used commercially for many years. Alcohols, such as methanol, are useful for preventing phase separation, but their volatility necessitates undesired expensive recovery systems. Much less volatile solvents, such as poly(oxyethylene)ethers have been used for making 1,4-hexadiene, but, unfortunately, new problems arise. In a typical continuous process for making 1,4-hexadiene by reacting ethylene with 1,3-butadiene in a poly(oxyethylene)ether solvent, the resulting reactor effluent contains not only the desired 1,4-hexadiene, but also some undesirable high-boiling by-products having $C_8$–$C_{12}$ hydrocarbon fractions. Thus, the reactor effluent stream is circulated to a flasher where ethylene, butadiene, 1,4-hexadiene and water are removed overhead. The residual liquid effluent in the flasher containing said high-boilers, rhodium catalyst and solvent is returned to the reactor for reuse. However, due to the fact that the proportion of high-boilers in the system continuously increases at a rapid rate, it is absolutely necessary to remove or purge part of the recycle liquid effluent from the flasher when the amount of high-boilers in said liquid effluent reaches about 25% by weight, and advisable to remove it when the recycle effluent contains more than about 10–15% by weight high-boilers. Of course, such removal requires the addition of make-up catalyst and solvent to the system. In order to make the process economical, the liquid effluent that is bled off or purged from the recycle stream must be treated to recover costly rhodium catalyst. The catalyst is recovered by a procedure that includes, among other things, burning off the liquid in the mixture. Catalyst recovery by this procedure has serious drawbacks.

First, large volumes of liquid must be removed from the system and transported for treatment in order to recover catalyst. Second, during catalyst recovery procedures involving burning, the loss of valuable solvent occurs; the solvent often amounts to as much as about 85% of the liquid effluent removed for catalyst recovery. The present invention provides a simple and convenient method by which loss of large quantities of solvent is prevented and provides for reuse of solvent and catalyst in the system.

SUMMARY OF THE INVENTION

It has now been discovered that during the preparation and recovery of the acyclic hydrocarbon 1,4-hexadiene by co-reacting ethylene and 1,3-butadiene in a poly(oxyethylene)ether solvent, high boiling hydrocarbon by-products that form during the reaction can be removed from the system without loss of solvent. The present invention is directed to a continuous process for recycling solvent and catalyst during the preparation of 1,4-hexadiene which comprises (a) co-reacting ethylene and 1,3-butadiene in the presence of a rhodium catalyst in a one-phase liquid reaction zone containing a water-soluble poly(oxyethylene)ether solvent having a molecular weight of at least 134, at a temperature of from 25–150° C., and a pressure of from atmospheric to 2000 p.s.i.g., (b) passing resulting liquid effluent from the reaction zone to a flasher operated at subatmospheric pressure to remove 1,4-hexadiene, (c) recirculating a major portion of residual liquid effluent from the flasher to the reaction zone while, at the same time, circulating the balance of residual liquid effluent constituting about 0.25–10% by weight of the flasher liquid effluent and containing poly(oxyethylene)ether solvent, rhodium catalyst and high-boiling hydrocarbon by-products having $C_8$–$C_{12}$ fractions to a vessel, (d) mixing said balance with at least about 30% by volume water in order to form an organic phase containing said high-boiling hydrocarbons and rhodium catalyst and an aqueous phase containing poly(oxyethylene)ether solvent and rhodium catalyst, (e) separating the aqueous phase containing solvent from the organic phase, and (f) circulating the poly(oxyethylene)ether solvent and rhodium catalyst from the aqueous phase to the reaction zone for reuse in the process. The aqueous phase can be conveniently separated from the organic phase by decantation. Generally, about 0.25–10%, preferably 0.4–6%, by weight, of the residual liquid effluent from the flasher is removed for treatment with water in order to keep the system functioning and to recover solvent and catalyst.

The present invention keeps undesired high-boilers from accumulating in the system. In contrast with prior methods, it achieves this objective without undue loss of the poly(oxyethylene)ether solvent by recovering over 90% of this solvent from the liquid purge and returning it to the system.

The co-addition of ethylene with 1,4-butadiene to give 1,4-hexadiene is preferably accomplished by supplying about equimolar proportions of these reactants in the presence of a rhodium-containing catalyst. Any of the rhodium catalysts familiar to those skilled in the art of making 1,4-hexadiene from ethylene and 1,3-butadiene can be used in the process of this invention. Representative rhodium catalysts include Rh (III) compounds, such as rhodium trichloride, rhodium trifluoride hexahydrate, rhodium tribromide, rhodium triiodide, rhodium carbonate, rhodium nitrate, rhodium sulfate, rhodium (acetylacetonate)$_3$, and [$(CH_3$—$CH$=$CH$—$CH_2)_2RhCl]_2$. Rhodium trichloride is especially preferred. The catalysts can be used with water and HCl. Representative rhodium (I)

catalysts that can be used include diethylene rhodium monochloride $(CH_2=CH_2)_2Rh_2Cl_2$, $(1,5\text{-cyclooctadiene})_2Rh_2Cl_2$, $(CH_2=CH-CH=CH_2)_2RhCl$, diethylene rhodium acetylacetonate, and 1,5-cyclooctadiene rhodium acetylacetonate. The Rh(I) compounds are activated by contacting them with oxidants such as chlorine, carbon tetrachloride, carbon tetrabromide, or an active organic chloride or bromide compound containing a chlorine or bromine atom attached to a carbon atom bearing a vinyl, substituted vinyl, phenyl, substituted phenyl, cyano or carbonyl radical or an alpha-chloroether oxygen atom as described, for example, in U.S. Pat. 3,565,821. When $RhCl_3\cdot 3H_2O$ is used as the catalyst, it is preferred to furnish at least one mole, most preferably 1.5–15 moles, of hydrochloric acid per mole of $RhCl_3$ to maintain catalyst activity.

The rhodium catalyst can be modified by using amides

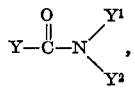

phosphoramides

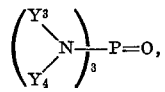

and phosphine oxides

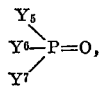

as described in U.S. Pat. 3,742,080. N,N'-dimethyl acetamide, hexamethylphosphoramide, and tributylphosphine oxide are preferred catalysts.

Additional rhodium catalysts that are also suitable in the present process include μ-dichlorotetraethylenedirhodium (I) and cyclopentadienylrhodium diethylene as described in U.S. Pat. 3,502,738.

The co-reaction of liquid butadiene with dissolved ethylene takes place in a one-phase liquid reaction system. In order to disperse the rhodium catalyst and achieve the desired homogeneity, it is necessary to use a solvent, i.e., a solubilizing agent. Water-soluble poly(oxyethylene)-ethers having a number-average molecular weight of at least 134 are used in the present invention. These oxyethylene ($-O-CH_2-CH_2-$) units can be present in ethylene oxide modified aliphatic polyols, e.g., reaction products of ethylene oxide with glycerine or pentaerythritol, or they can be in mono- or dialkyl terminated poly(oxyethylene) compounds having the structure $$R-(O-CH_2-CH_2-)_mO-R',$$

where R is H or alkyl (preferably $C_1-C_4$), and R' is independently alkyl (preferably $C_1-C_4$), and m is an integer. Representative examples of these poly(oxyethylene)ether compounds include diethylene glycol dimethyl ether, triethylene glycol dimethyl ether, triethylene glycol monomethyl ether, diethylene glycol monobutyl ether, and tetraethylene glycol dimethyl ether, ethoxy triethylene glycol, trimethylene glycol dimethyl ether, and triethylene glycol monobutyl ether.

The reactor in which 1,4-hexadiene is prepared is operated at temperatures between about 25° C. and 150° C. In order to attain a fast reaction rate, it is best to operate at 50° C. or above. The preferred range is 50° C. to 100° C. The pressure can range from one atmosphere absolute to at least 2000 p.s.i.g. A practical range for generally available reactors is 100 to 700 p.s.i.g. High pressures favor fast reaction rates. The residence time for reaction thus depends on the temperatures and pressures used as well as the catalyst concentration and the degree of conversion desired (higher catalyst concentrations and lower degrees of conversion affording shorter residence times).

The reactor liquid effluent containing 1,4-hexadiene, poly(oxyethylene)ether solvent, rhodium catalyst, high-boiling by-products containing $C_8-C_{12}$ fractions, and unreacted ethylene and 1,3-butadiene flows to a conventional flash chamber operated at subatmospheric pressure and, preferably, at a temperature above that in the reactor. Heat can be supplied by conventional means such as steam. The operating pressure is selected to cause quantitative volatilization of ethylene, 1,3-butadiene, and 1,4-hexadiene which exit overhead to conventional scrubbers and fractionation means for separating and recovering 1,4-hexadiene. Water vapor also leaves the flasher. The pressure should not be so low as to cause significant loss of poly(oxyethylene) solvent. In typical operations, the flasher will be maintained at 75–95° C. and 3–8 p.s.i.a.

Flasher residual liquid effluent contains active rhodium catalyst, poly(oxyethylene)ether solvent, and the undesire high-boiling by-products. This residue exits at or near the bottom of the flasher, flows through strainers to remove an entrained solid matter (such as glass which may have come off the reactor walls), then passes through a heat exchanger where it is cooled slightly below reaction zone temperature, and finally enters a pump which delivers it into the reactor recycle feed line for reuse in the system.

Since the residual liquid effluent from the flasher contains the high-boiling by-products having $C_8-C_{12}$ fractions, after the process has been in operation for only about two hours, the liquid effluent stream from the flasher usually contains at least about 5 weight percent of said high-boilers. The amount of high-boilers in the residual liquid effluent is kept as low as possible, preferably below about 10–15 weight percent; the tolerable upper limit is about 25 weight percent. The amount of high-boilers in the residual liquid effluent stream can be determined as follows:

A graduated Babcock milk test bottle is used (the type conventional for butterfat analysis). A 3.5-cc. sample of the residual liquid effluent stream from the flasher being recycled to the reactor is taken, using a 5-cc. syringe, and weighed to ±0.0010 gram. After the sample has been injected into the test bottle, water is added up to the curved shoulder of the bottle, and the resulting mixture is shaken well. Two layers separate on standing: an upper organic phase (high-boilers) and a lower phase (water+poly(oxyethylene)). Water is carefully added until the upper level of the organic phase reaches the top mark of the graduated section of the small tubular neck of the bottle. The bottle is then centrifuged for 15 minutes at 5000 r.p.m. The graduated reading for the lower level of the organic phase, multiplied by 0.2, gives the volume of the high-boilers in the sample. The known density of the high-boilers is used to convert the measured volume to weight. A typical density for 1,4-hexadiene byproducts made with $RhCl_3$ is 0.85 g./cc. Thus, Wt. percent high-boilers $$=\frac{0.2\times\text{reading}\times\text{high-boiler density}\times 100}{\text{sample weight}}$$

Generally, the invention is used when the proportion of high-boilers in the residual liquid effluent stream from the flasher that is being recirculated to the reaction zone reaches, or exceeds, about 5 weight percent.

Most of the residual liquid effluent from the flasher flows through the T that is positioned between the strainers and a heat exchanger. A small proportion of the order of 0.25–10%, usually 0.4–6%, by weight, of the residual liquid effluent is removed, or purged, from the stream, enters a side conduit and flows via a pump to a vessel where, in accordance with the present invention, it is mixed with water. The small portion of the effluent stream that is mixed with water is allowed to stand in a vessel, such as a phase decanter, so as to form two phases, an upper organic phase containing the undesirable high-boiling byproducts and most of the rhodium, and a lower aqueous phase containing valuable solvent and some catalyst. Separation of the organic phase from the water phase occurs in the phase decanter.

The amount of water used to separate solvent from high-boilers is that which will result in distinct phase separation of the water phase and organic phase, usually after the mixture has been allowed to stand for about two hours. It is preferred to use about an equal volume of water per volume of effluent being treated during the mixing step. The minimum amount will depend on the relative proportions of high-boilers and poly(oxyethylene) in the flasher liquid effluent. Usually, at least about 30% by volume of water is employed per volume of residual liquid effluent treated.

Preferably, decantation is used to separate the organic and water phases. The phase decanter preferably has a level control valve which can be automatic or manually operated. This valve is positioned to tap off excess water when the water level rises above a preselected level in the decanter. Optionally, the decanter may be furnished with a coalescing membrane at the inlet port, a hydrophobic membrane at the upper outlet port through which the organic phase exits, and a hydrophilic membrane at the bottom outlet port through which water and dissolved poly-(oxyethylene)ether exit.

The residence time of the material in the decanter can be determined by routine experimentation and is selected to insure that clear phase separation occurs. In principle, as little as 5 minutes would be required; however, from a practical industrial standpoint residence times of about from 0.5 to 3 hours are more suitable because the decanter must be able to accommodate available level control systems. Residence time is decreased as the decanter temperature is raised; the increased fluidity of the organic phase quickens phase separation. However, since the residual liquid effluent from the flasher is very hot, it is not generally necessary to heat the decanter. The valuable solvent in the aqueous phase can be returned to the reaction zone directly or the aqueous phase can be circulated to the flasher where water is removed before the solvent is returned to the reaction zone for reuse.

EXAMPLE

The following example illustrates, but does not limit, the present invention.

A glass-lined, steel pressure reactor is employed, furnished with an agitator and suitable inlet and outlet ports. During operation, the residence time is about 90 minutes, the temperature is 74° C., and the pressure is 31.6 kg./sq. cm. gauge. Separate make-up streams supply gaseous ethylene and liquid 1,3-butadiene in a 1:1 molar ratio to the reactor. A separate stream supplies $RhCl_3$ to the reactor in a mixture made by dissolving 189 grams of $RhCl_3 \cdot 3H_2O$ in dilute hydrochloric acid to a volume of 3.785 liters and then diluting 1.893 liters of the resulting aqueous rhodium catalyst solution to 18.926 liters with the solvent triethylene glycol monobutyl ether. The flow rate of rhodium catalyst solution is adjusted to attain the greatest possible heat evolution that can be handled by the reactor's cooling capacity. About 0.0000164 gram-mole of $RhCl_3$ is supplied for every gram-mole of 1,4-hexadiene produced. [0.03 troy ounces Rh metal/100 pounds 1,4-hexadiene.]

The reactor liquid effluent stream contains 1,4-hexadiene, ethylene, 1,3-butadiene, triethylene glycol monobutyl ether, water, high-boiling hydrocarbon by-products having $C_8$–$C_{12}$ fractions and acidified rhodium catalyst. The liquid effluent passes at the rate of 1000 kg./hr. through a flash valve, thence along a conduit to a heat exchanger, emerges at about 85° C. and is circulated to a flasher operated at 0.28 kg./sq. cm. (absolute). Inside the flasher there is a temperature gradient, the top being at 80° C., the bottom being at 85° C. 1,4-Hexadiene, ethylene, and 1,3-butadiene, water vapor, and HCl exit overhead at the rate of 800 kg./hr. and flow along a conduit to a 1,4-hexadiene recovery unit where the HCl is removed by scrubbers and 1,4-hexadiene is separated by fractionation from ethylene and 1,3-butadiene (which are recycled, after cooling, to monomer supply conduits for reuse).

The residual liquid effluent from the flasher containing said by-product high-boilers, triethylene glycol monobutyl ether solvent, and rhodium catalyst is removed through a conduit from the bottom of the flasher at the rate of 200 kg./hr. After passing through one of a pair of parallel strainers, it is circulated via a conduit to a T-joint.

The major main portion of this stream (containing triethylene glycol monobutyl ether, by-product high-boilers, and rhodium catalyst) is returned to the reaction zone at the rate of 196.8 kg./hr. The balance of the residual liquid effluent that is bled off, or purged, from the main effluent stream flows at the rate of 3.2 kg./hr. to a pump and thence along a conduit to a mixing T where residual liquid effluent and water are mixed by impinging on each other. Water enters the mixing T at the rate of 3.2 kg./hr. via a conduit. The resulting mixture flows along a conduit to a decanter. After about 1.4-hour residence time in the decanter, the mixtures separates into an upper organic layer (containing by-product high-boilers and 90–95% of the rhodium catalyst in the purge stream) and a lower aqueous phase (containing water, triethylene glycol monobutyl ether solvent, and remaining rhodium catalyst). A level control on the decanter taps off excess aqueous phase. The aqueous phase leaves the bottom of the decanter at the rate of 5.6 kg./hr. (2.4 kg./hr. ether and 3.2 kg./hr. water). The aqueous phase containing solvent and rhodium is passed through a conduit to the flasher where the water is removed overhead. The solvent is recycled for use in the system. The organic phase substantially free of solvent and containing said high-boilers and rhodium flows at the rate of 0.8 kg./hr. to a collection unit and is removed from the system for subsequent recovery of rhodium catalyst by, among other things, burning off the high-boilers.

I claim:

1. A continuous process for recycling solvent and catalyst during the preparation of 1,4-hexadiene which comprises (a) co-reacting ethylene and 1,3-butadiene in the presence of a rhodium catalyst in a one-phase liquid reaction zone containing a water-soluble poly(oxyethylene)ether solvent having a molecular weight of at least 134, at a temperature of from 25–150° C., and a pressure of from atmospheric to 2000 p.s.i.g., (b) passing the resulting liquid effluent from the reaction zone to a flasher operated at subatmospheric pressure to remove 1,4-hexadiene, (c) recirculating a major portion of residual liquid effluent from the flasher to the reaction zone, while, at the same time, circulating the balance of residual liquid effluent constituting about 0.25–10% by weight of the flasher effluent and containing poly(oxyethylene)ether solvent, rhodium catalyst and high-boiling hydrocarbon by-products having $C_8$–$C_{12}$ fractions to a vessel, (d) mixing said balance with at least about 30% by volume water in order to form an organic phase containing said high-boiling hydrocarbons and rhodium catalyst and an aqueous phase containing poly(oxyethylene)ether solvent and rhodium catalyst, (e) separating the aqueous phase from the organic phase, and (f) circulating the poly(oxyethylene)ether solvent and rhodium catalyst from the aqueous phase to the reaction zone for reuse in the process.

2. A process of Claim 1 wherein the aqueous phase is separated from the organic phase by decantation.

3. A process of Claim 1 wherein separate streams of residual liquid effluent and water are mixed by impinging on each other and subsequently forming separate phases.

4. A process of Claim 1 wherein the poly(oxyethylene)ether solvent is triethylene glycol monobutyl ether.

5. A process of Claim 1 wherein the catalyst is rhodium trichloride.

6. A process of Claim 1 wherein about from 0.4–6% by weight of the residual liquid effluent from the flasher is bled off for treatment with water.

7. A process of Claim 1 wherein the high-boiling hydrocarbon by-products in the flasher residual liquid effluent stream are maintained below about 25% by weight.

8. A process of Claim 6 wherein the high-boiling hydrocarbon by-products in the flasher residual liquid effluent stream are maintained below about 10% by weight.

9. A process of Claim 1 wherein the aqueous phase after separation from the organic phase is circulated to the flasher for removal of water, and solvent is subsequently circulated to the reaction zone for reuse.

References Cited
UNITED STATES PATENTS

| | | | |
|---|---|---|---|
| 3,013,066 | 12/1961 | Alderson | 260—680 B |
| 3,152,195 | 10/1964 | Uerbang | 260—680 B |
| 3,640,898 | 2/1972 | Su | 260—680 B |
| 3,742,080 | 6/1973 | Su | 260—680 B |

PAUL M. COUGHLAN, JR., Primary Examiner